Nov. 15, 1938.  A. QUENTIN  2,137,061
PROCESS AND DEVICE TEMPERING GLASS
Filed Feb. 23, 1937  2 Sheets-Sheet 1

Alberto Quentin
INVENTOR his ATTY.

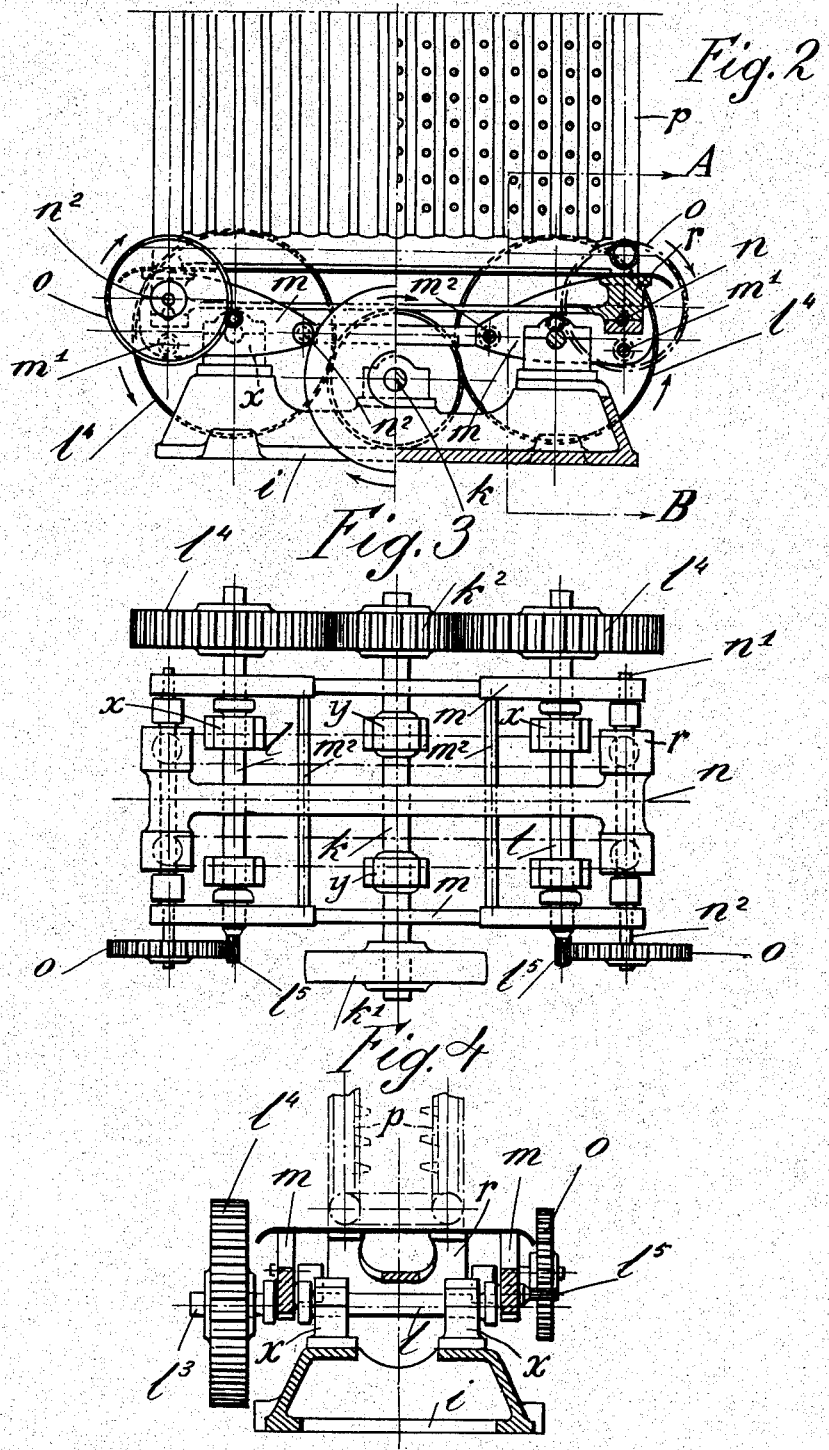

Patented Nov. 15, 1938

2,137,061

UNITED STATES PATENT OFFICE 2,137,061

PROCESS AND DEVICE FOR TEMPERING GLASS

Alberto Quentin, Florence, Italy

Application February 23, 1937, Serial No. 127,144
In Italy May 23, 1936

4 Claims. (Cl. 49—45)

The invention concerns a process, and the device relating thereto, for the tempering of glass or other materials, especially in sheets of any thickness, sheets of thin glass, for preference. It is based upon the principle of the sheets being tempered by means of air or other gases, vapours or mixtures of fluids of any description, with absolute immediateness in respect of their issue from the oven or furnace and with a maximum admixture of air or other gas to be directed in jets against the pre-heated sheet in such a manner as not to strike the same point of said sheet, ventilating same, but rather to form through the jet itself an ensemble of interlooping movements comprised within a sort of circle (Fig. 7).

The result of this method is the improvement, through the considerable increase thereof, of all the qualities of mechanical resistance—flexion, torsion, thrust, etc.—of the glass thus treated, even in the case of slight thicknesses, of plain and stamped glass or such as is granulated in relief and characterized by the breaking up into minute inoffensive granules.

Essentially, the invention consists in the ensuring, in any manner, that chambers provided with blasts (or with aspirators) when once in the vicinity of the glass or other material to be tempered, shall become endued with movements, associated in any manner, without any necessity for shifting the sheet being tempered. Said blasts must be very close together.

There is also provided a simple apparatus whose office it is to enable the sheet to emerge from the oven or furnace and to permit the immediate introduction of said sheet between the blast-elements which are uniformly distributed, facing both sides, with vent-holes that are parallel to the sheet, or diversely placed, or with straight or inclined slots, or with a single slot, disposed near the outlet from the oven or furnace.

But one operation is effected for the purpose of obtaining the issue of the sheet and the conveyance thereof to between the blast-elements and the starting of the air or fluid set in motion by a ventilator or compressor or aspirator as well as that of the oscillatory apparatus. Here, various immediately consecutive operations are also claimed.

The accompanying drawings show schematically an example of the device, as a whole which may also differ as to its mechanical embodiment provided that the action of the greater part of the elements be simultaneous, or almost so, without thereby departing from the present invention.

In said drawings—

Fig. 2 shows, separately, one half of the oscillatory device, in a front view and one half in longitudinal section;

Fig. 3 shows a plan of the said apparatus;

Fig. 4 is a cross section on line A—B of Fig. 2;

Figure 1:
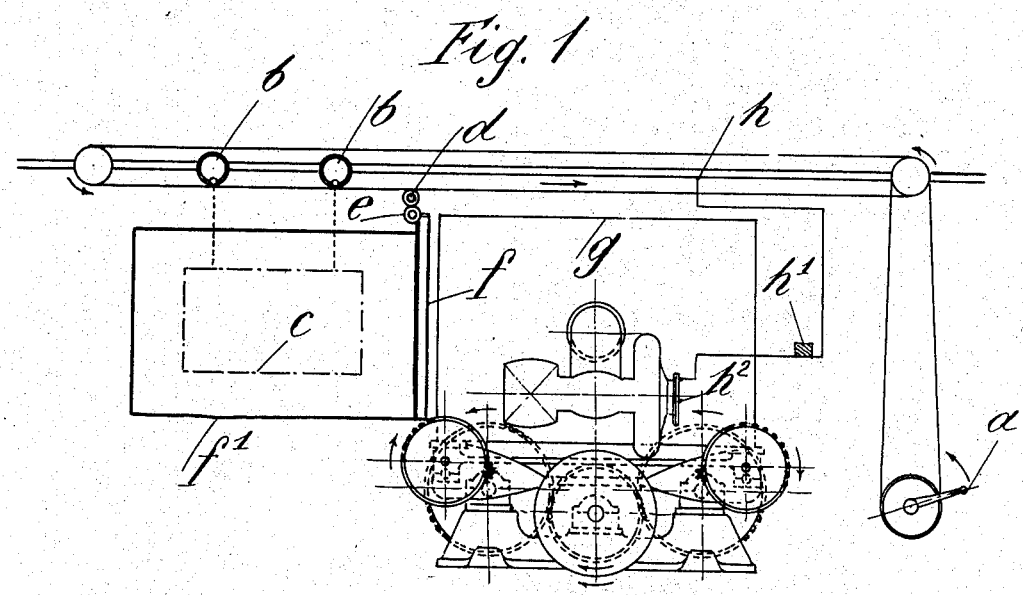
Fig. 1 shows, schematically, the device as a whole in a front view.
Figure 5:
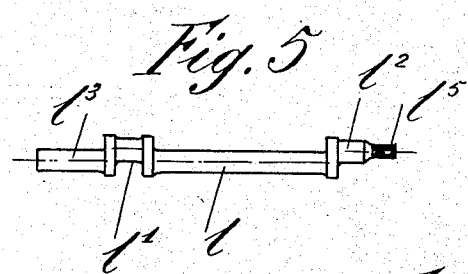
Fig. 5 shows, by itself, one of the crank shafts which impart the translational movement to the apparatus.
Figure 6:
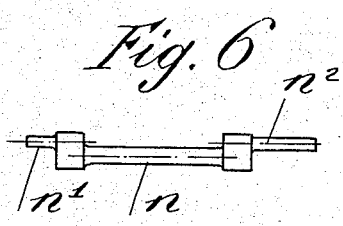
Fig. 6 shows, also by itself, one of the crank shafts which impart the rotary motion to the apparatus.

Referring to the drawings and particularly Figure 1, $c$ denotes the sheet arranged in the furnace $f$ and supported from a carriage $b$ disposed on a runway, the carriage $b$ is moved to the right by turning the handle $a$, the door $f$ of the furnace being opened by means of the gearing $d$ and $e$, to allow the exit of the sheet, which is thus moved into position between the blowing frames designated $g$. On reaching the correct position, the carriage $b$ closes an electric contact $h$, which starts the fan motor $h^2$ through the relay $h'$.

Referring to Figures 2 to 6, the blowing frames P are carried on a frame work R, which is given a double rotary movement hereinafter described. The fan is immediately started, and air, or other fluid, into the blast elements, comprising either caissons provided with nozzles facing each other or systems of pipes likewise provided with suitable nozzles facing each other, or further apertures or slots intended to direct the air or other gas or mixture against the surfaces of the sheets. These blasts must be very close together.

These caissons or pipe elements, provided, preferably, in either case, with nozzles or vent-holes are carried by an oscillatory apparatus according to Figs. 2 to 6, inclusive.

In between the blast elements and the sheet there are arranged thin wires, preferably steeled, adapted to prevent the sheets from striking against the nozzles or perforated caissons, as the faces of the two blast elements are not very far apart. The two frames supporting the wires are likewise shiftable so that they may be brought closer together as soon as the sheet has penetrated in between the two blasts.

Figure 7:
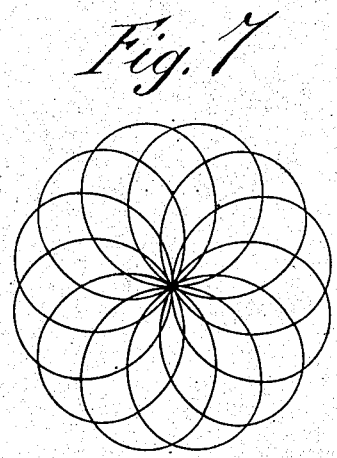
Fig. 7 shows schematically the motion taken on by each single nozzle, viz. by the centre of each vent for air or any other fluid.

A driving shaft $k$, with pulley $k'$ and two crank shafts $l$ are carried in bearings $y$ and $x$, respectively, in the main frame $i$. The shafts $l$ are driven from the shaft $k$ by gear wheels $k^2$ and $l^4$. A framework consisting of the side bars $m$ and the cross bars $m^2$ is carried on the cranks $l'$ and $l^2$ of the shafts $l$, and is thereby given a rotary movement. The framework $m$, $m^2$ carries at each end, a shaft $n'$, $n^2$ having a central crank $n$, which carries the framework $r$ of the blowing frames. Each shaft $n'$, $n^2$ is rotated by the gear wheel $o$ which engages with a pinion $l^5$ on the shaft $l$. Thereby a second rotary motion is given to the framework $r$ which is superposed on the rotary motion given to the framework $m$, $m^2$. In consequence, every point of the framework $r$ and the blowing frames executes a movement of which the path is a hypocycloid. In the construction shown in the drawings the relation between the periods and amplitudes is such that every point on the framework $r$ describes a continuous line of movement forming interlooping oval figures, the major axes thereof coinciding with the radii of a circle describing the movement of the first frame as indicated clearly in Figure 7. This complex movement allows the jet not to strike the sheet at the same point, but to cause, instead, a movement of air or other fluid, in such a manner that the interlooping of these jets affords a regular and perfect intermixture of the air intended to be directed against the sheet, or to be aspirated by the latter. In the figure there is represented the line created by each nozzle, but in point of fact, as the lines of the neighbouring nozzles interloop at this point, the interlooping is still more intricate. Evidently, similar movements—not shown here—may be adopted with analogous results.

In Fig. 2 it will be seen how the blast elements, preferably constituted by systems or groups of pipes, may be arranged upon the shafts $n$ and consequently, above the oscillatory apparatus, shown as an example.

It should be understood that the drawings constitute but a schematic form of example, given solely by way of a practical showing of the invention, it being possible for said invention to vary as to its forms and arrangements without, however, departing from the scope of the concept underlying the invention, which may be totally or partially utilized as required, or may be restricted to the double movement of the caisson only to the crank for rendering the actions simultaneous.

This system, serves as already pointed out, more especially for the tempering of thin sheets, viz. of those whose thickness measures less than 3 or 4 mm.; it may become necessary in respect of such sheets, to stretch same by means of special frames, or by counterweights, etc.

Said sheets may also be stamped or embossed, or, anyway, not be smooth in any other way.

The blast or aspirating elements with nozzles, may also be endowed with the possibility of movement so as to enable their being moved away from or nearer to the sheet. This shifting, even when continuous, combined with the other movements of the cooling elements, enables the varying of the intensity of the jet of air or other fluid. They contribute, furthermore, to the rapid formation of the outer compressed layers, when the said blast elements are brought very close to the sheet, in the first instance, in order to increase the intensity of the jet, immediately upon the extraction of same.

It is advisable to dispose a sole blast element between two ovens or furnaces in such a manner as to have the sheets alternatively carried from one of the ovens or furnaces to the cooler and from this transported by heaving (raising).

Having now particularly described and ascertained the nature of my said invention and in what manner the same is to be performed, I declare that what I claim is:

1. The herein described method of tempering glass or other materials, which method consists in directing jets of cooling medium thereon so that the jets sweep the surface of the glass along predetermined paths, each thereof following a continuous line and forming interlooping oval figures the major axes being the radii of a circle.

2. The herein described method of tempering glass or other materials, which method consists in sweeping the surface of the glass with a series of jets of cooling medium along predetermined paths, each thereof following a continuous line beginning and ending in the same point and forming a plurality of interlooping oval figures having their major axes coinciding with the radii of a circle.

3. In an apparatus for tempering glass sheets and the like, the combination of a frame, shafts having cranks connected to the frame and terminating gear wheels at one of their ends and with pinion gears at their opposite ends, further shafts having cranks and being journalled in the frame at opposite ends thereof, gears at the same ends of said further shafts, meshing with the pinion gears of the first shafts, a series of nozzles and a nozzle supporting frame carried on the cranks of the said further shafts, whereby rotary movement of the first shafts causes the cranks thereof to impart a circular movement to the first frame and rotary movement of the further shafts imparts to the nozzle carrying frame a circular movement about the axes of the further shafts, said circular movement of the nozzle carrying frame being modified by the circular movement of the first frame to cause each of the nozzles to follow a continuous line of movement forming interlooping oval figures the major axes thereof coinciding with the radii of a circle describing the movement of the first frame.

4. An apparatus for tempering glass, as claimed in claim 3, in which the nozzles are arranged in two series spaced apart and directed towards each other and opposite surfaces of the glass sheet to be tempered, and means for suspending the glass sheet and causing the same to be moved into position between the spaced series of nozzles and over the nozzle supporting frame.

ALBERTO QUENTIN.